United States Patent
Shin et al.

(10) Patent No.: US 8,658,455 B2
(45) Date of Patent: Feb. 25, 2014

(54) SYSTEM AND METHOD FOR PRODUCING FLEXIBLE DYE-SENSITIZED SOLAR CELLS BY A ROLL-TO-ROLL PRINTING PROCESS

(75) Inventors: Kee-Hyun Shin, Seongnam-si (KR); Jin-Hyun Ahn, Seoul (KR); Hyun-Kyoo Kang, Seoul (KR); Yun Shick Eom, Seoul (KR)

(73) Assignee: Konkuk University Industrial Cooperation Corp., Seoul (KR)

( * ) Notice: Subject to any disclaimer, the term of this patent is extended or adjusted under 35 U.S.C. 154(b) by 70 days.

(21) Appl. No.: 12/830,267

(22) Filed: Jul. 2, 2010

(65) Prior Publication Data
US 2011/0159628 A1    Jun. 30, 2011

(30) Foreign Application Priority Data
Jul. 2, 2009    (KR) .................. 10-2009-0059999

(51) Int. Cl.
*H01L 31/042* (2006.01)
(52) U.S. Cl.
USPC ............................................................ 438/61
(58) Field of Classification Search
USPC .................. 438/61, 62; 257/E31.001, E31.11
See application file for complete search history.

(56) References Cited

U.S. PATENT DOCUMENTS

| | | | | |
|---|---|---|---|---|
| 2003/0192583 A1* | 10/2003 | Ryan | | 136/244 |
| 2005/0067007 A1* | 3/2005 | Toft | | 136/245 |
| 2005/0194040 A1* | 9/2005 | Hirose | | 136/263 |
| 2006/0112988 A1* | 6/2006 | Morooka | | 136/256 |
| 2008/0210302 A1* | 9/2008 | Gupta | | 136/260 |
| 2010/0084008 A1* | 4/2010 | Kim et al. | | 136/252 |
| 2010/0206350 A1* | 8/2010 | Montello et al. | | 136/244 |
| 2010/0300515 A1* | 12/2010 | Monden et al. | | 136/252 |
| 2011/0005066 A1* | 1/2011 | Crofoot et al. | | 29/623.5 |
| 2011/0120329 A1* | 5/2011 | Shin et al. | | 101/214 |

FOREIGN PATENT DOCUMENTS

| WO | WO 2008093129 A2 * | 8/2008 |
|---|---|---|
| WO | WO 2009114189 A2 * | 9/2009 |
| WO | WO 2009142351 A1 * | 11/2009 |

* cited by examiner

*Primary Examiner* — Michele Fan
(74) *Attorney, Agent, or Firm* — LRK Patent Law Firm

(57) ABSTRACT

A system and a method for mass production of Dye-Sensitized Solar Cells at low cost via a continuous roll-to-roll process. While a flexible conductive substrate is constantly in transit on a conveyor, a titanium dioxide ($TiO_2$) layer is: formed by spray printing; sintered; dyed in a dye tank, with or without immersion, by a dye solution sprayed from nozzles while the substrate moves along a conveyor line configured as multiple alternating U-shaped lines; washed and dried; loaded with a gel-type electrolyte by roll-type printing; and covered and pressure-sealed by another flexible conductive substrate, aided by preloaded sealants. The dye solution in the dye tank may be re-circulated, during which process, the temperature, level, concentration of the dye solution may be adjusted and controlled. The roll-to-roll production process may further include erecting anti-leakage walls and leveling the electrolyte layer for preventing post-sealing leakage of the electrolyte.

28 Claims, 11 Drawing Sheets

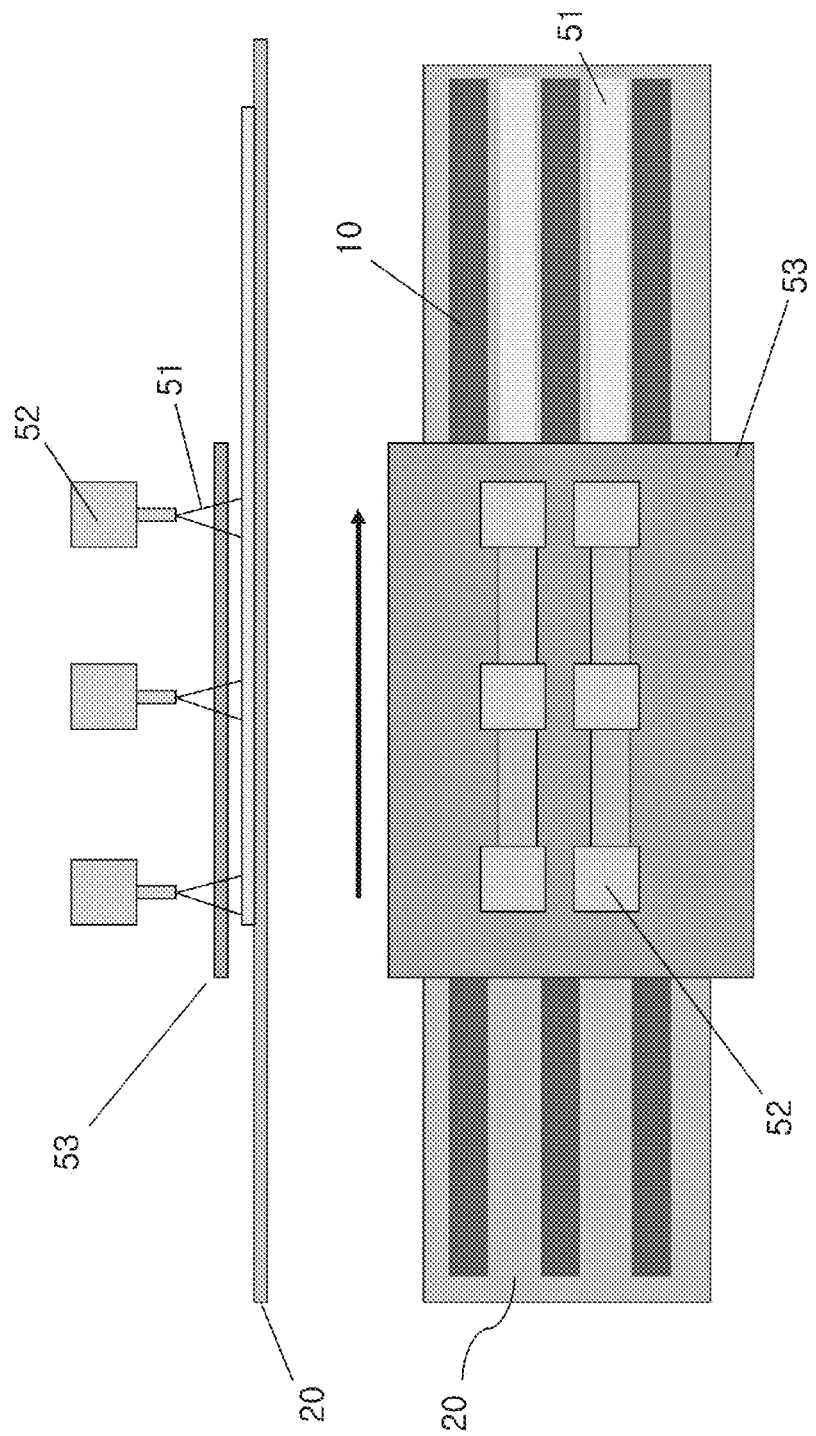

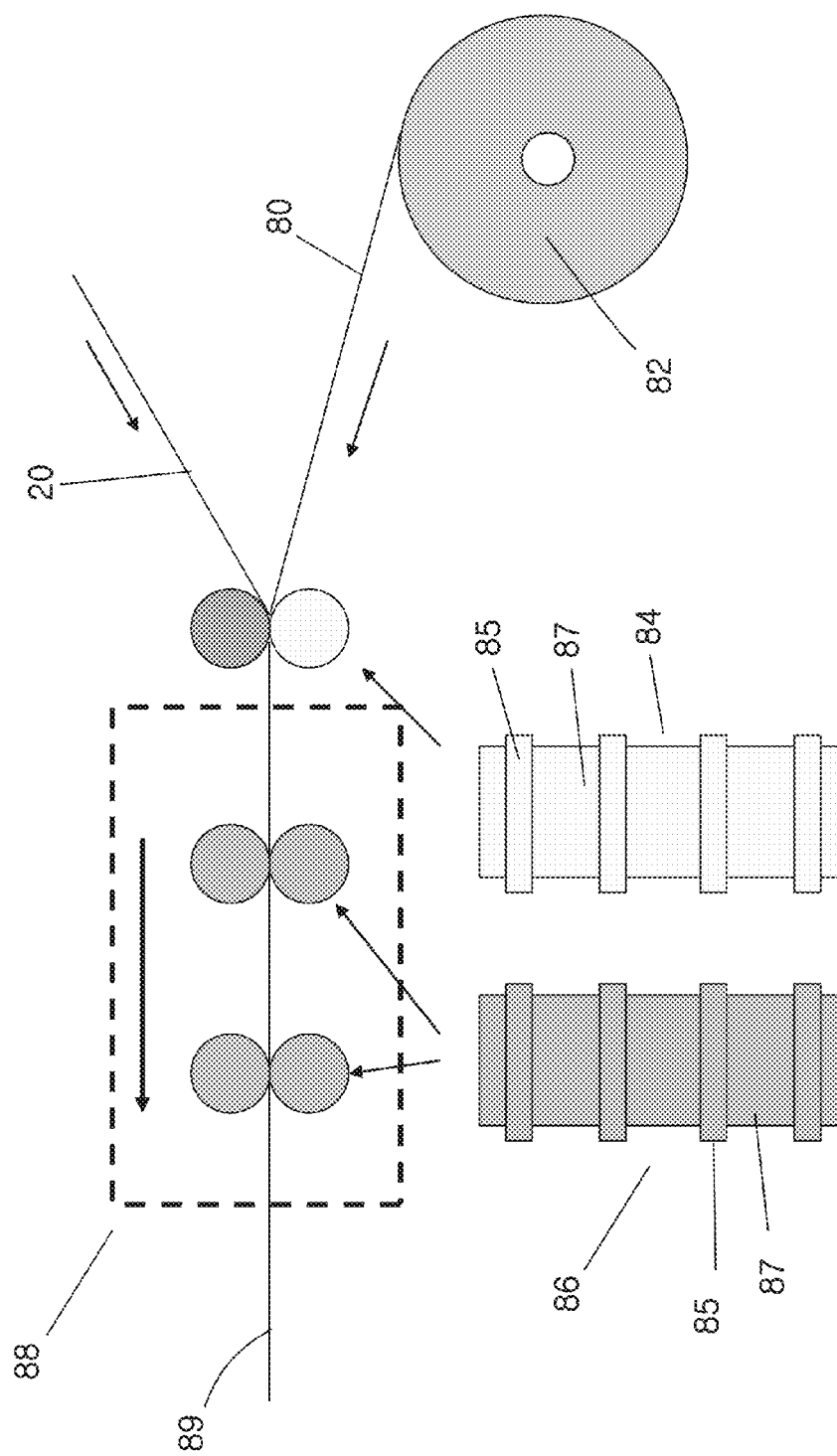

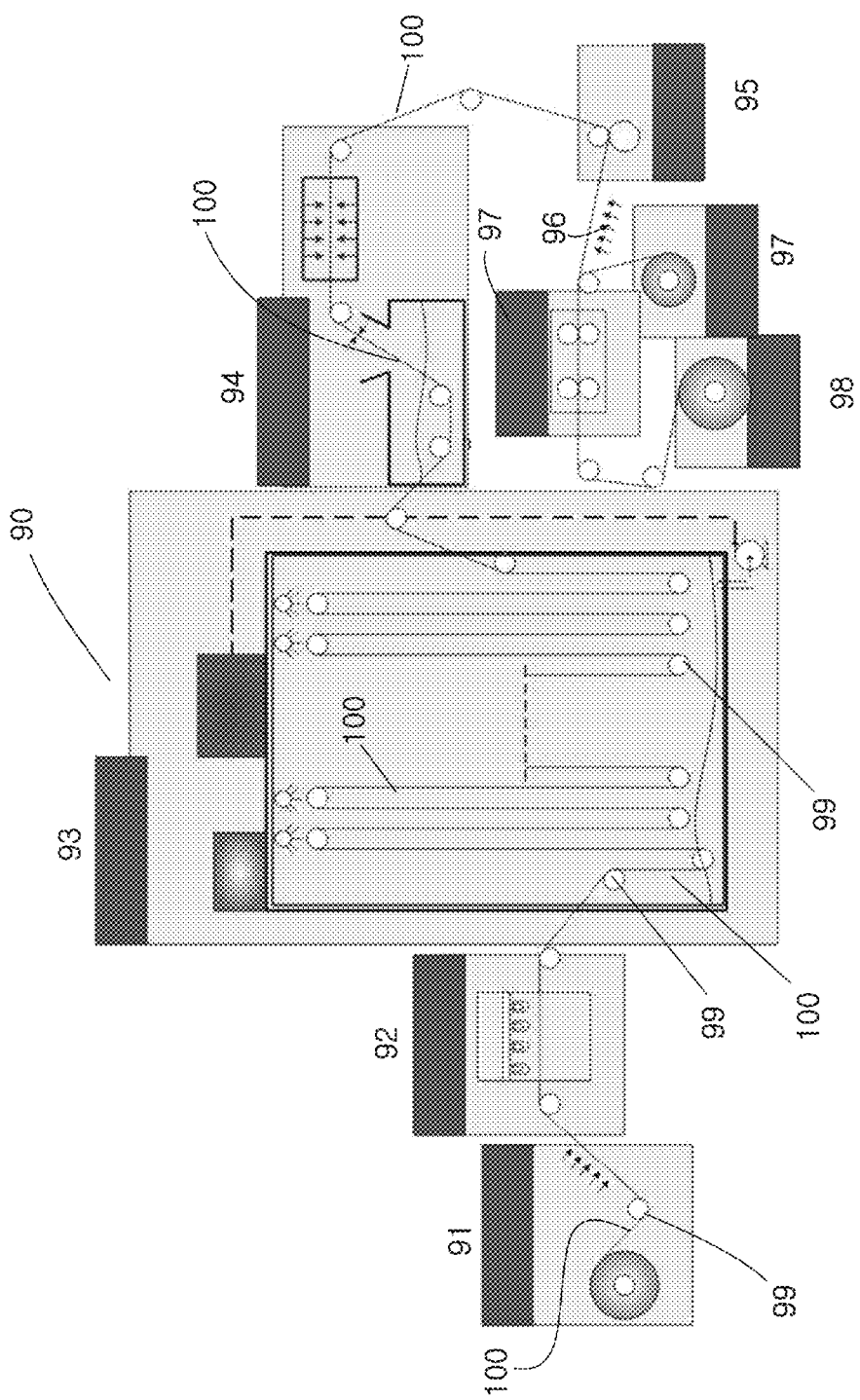

SYSTEM AND METHOD FOR PRODUCING FLEXIBLE DYE-SENSITIZED SOLAR CELLS BY A ROLL-TO-ROLL PRINTING PROCESS

CROSS-REFERENCE TO RELATED APPLICATIONS

This application claims priority, under 35 U.S.C. §119(a)-(d), to a foreign application of No. 10-2009-0059999, filed in Korea on Jul. 2, 2009, and hereby claims the benefit thereof.

BACKGROUND OF THE INVENTION

The present invention is directed to a system and a method for continuously and economically producing Dye-Sensitized Solar Cells (DSSCs) through a roll-to-roll process.

Concerns about depletion of natural resources, the stability of thermal and atomic electric power generation systems and their impact on the environment gave rise to intensive global research efforts for developing systems utilizing solar and wind energies, which are relatively typical environmental friendly energies.

Particularly, solar energy that can be converted into electric energy is attracting the spotlight as the alternative energy of the future in the respect that it is free of pollution and is of unlimited resource.

For these merits, solar electric power generation systems are utilized in automobiles, toys, residential generation of electricity, street lights, clock towers, unmanned lighthouses, and various communication facilities.

In general, a system of solar electric power generation includes solar cell modules, batteries, and electric transformers, though its components may change depending on the field of application, the load types, and plant site conditions. The solar cell modules convert sunlight into electric energy, the batteries store the electric energy generated from the solar cell modules, and the electric transformers convert the direct currents produced from the solar cell modules into alternating currents.

The biggest problem with conventional solid state solar cells is the relatively high cost due to the primary material, silicon, which is expensive and the processing of silicon is costly. To reduce the cost, a number of different approaches have been attempted over the last decade. One of the approaches is to make the layer of silicon, which is traditionally required to be relatively thick for reasonable photon capture rates, thinner. But to date, that approach has met with a variety of practical problems. Among other approaches attempted to overcome various limitations of the solid state semiconductor solar cells are the developments of organic film solar cells, also called polymer solar cells, and Dye-Sensitized Solar Cells (DSSCs), also called Grätzel's cell.

A DSSC is composed largely of a photo-anode, molecular dyes as sensitizers, a counter electrode, and an electrolyte. Upon a transparent electrode, a layer of porous nanomaterial is formed, which is covered with photosensitive molecular dyes. The layer of nanomaterial operates as the conventional n-type photo-anode for a silicon solar cell, as well as a scaffold material that provides huge surface area to hold thereupon large numbers of the dye molecules that generate photoelectrons in a three dimensional matrix, because the dye molecules are nanometer sized and a thick layer of dye molecules are needed to capture sufficient amount of incoming sunlight. Typically, titanium-dioxide ($TiO_2$) nano-particles are used for such nanomaterial due to its known high efficiency and chemical stability. Above the layer of molecular dye, a layer of electrolyte, a liquid conductor, is formed and thereupon is placed a counter electrode, typically a metal electrode acting as the p-type cathode for a silicon solar cell.

When sunlight passes through the transparent electrode into the dye layer, the photons are absorbed by the photosensitive molecular dyes attached to the $TiO_2$ nano-particles. Then an electron of the dye molecule becomes excited from a ground state to excited states (photoexcitation) to provide photoelectrons, which are then injected into the conduction band of the $TiO_2$. In a traditional p-n junction semiconductor solar cell, the charge carriers (electrons and holes) move by drift, driven by electrostatic field established across the electrodes. By contrast, in a DSSC, the charge carriers (electrons) from the $TiO_2$ move by diffusion to the transparent electrode according to the gradient of electrochemical potential or carrier concentration. The electrons then flow from the transparent electrode through an external circuit for powering external loads and re-enter the cell through the counter electrode, and into the electrolyte.

The injection of electrons from the dye molecules into the $TiO_2$ does not introduce, like the traditional p-n type semiconductor solar cells, holes in $TiO_2$, but only an extra electron. The dye molecule, which lost an electron and would decompose if another electron is not provided, strips an electron from an iodide, typically contained in the electrolyte, to oxidize it into a triiodide. The triiodide then mechanically diffuses to the counter electrode where it recovers an electron re-introduced into the cell through the counter electrode after flowing through the external circuit. The rapid repetition of such oxidization and reduction processes in a DSSC makes possible the generation of electric current from sunlight. Also, although it is possible in principle for the electrons from $TiO_2$ to recombine into the dye molecules, which would inhibit photo-current, the rate at which this occurs is quite slow as compared to the rate the dye molecules regain electrons from surrounding electrolyte.

DSSCs are currently regarded as the most efficient third generation solar cells available and have the following advantages over conventional semiconductor solar cells. First, DSSCs are more economic than the conventional solar cells, such as silicon solar cells, for their manufacturing cost is only one-fifth of the latter while their energy conversion efficiency is only ten percent smaller than that of the latter. And unlike conventional solar cells, DSSCs can be made into light, thin, bendable, flexible, and transparent sheets, while mechanically robust, promising huge fields of commercial applications. Also, the conventional solar cells show a rapid reduction in operational efficiency as the temperature increases because they are encased in a glass box for protection from potential physical damage. By contrast, being surrounded by thin conductive layers that is structured to rapidly radiate heat away easily, DSSCs retain a relatively stable efficiency over a wide range of temperature. Further, for the conventional semiconductor solar cells, the energy conversion rate highly depends on the incidence angle of the sun light, which changes continuously as the sun moves. But DSSCs have less fluctuation in the energy conversion rate with the change of light incidence angle. Still further, DSSCs work even in low-light conditions such as under cloudy skies, while the traditionally designed silicon cells suffer a cut off of electricity at some lower limit illumination.

Accordingly, DSSCs have now become the subject of worldwide research and development efforts. Despite the numerous advantages, however, DSSCs have the drawbacks that they cannot be mass-produced due to the absence in the art of any manufacturing system, facilities, or teachings for a large-scale production. Typically, they have been produced only one by one at a time manually in the laboratories of either academia or industry.

To describe the conventional manufacturing method of DSSCs, in the case of the original Grätzel design, two glass substrates, front and back substrates, each typically sized 150 millimeters in width and length, are prepared and go through an isolation process in which a laser beam cuts grooves on a surface of each glass plate for locating electrodes and separating abutting cells. Next, along the edge of the back substrate, multiple orifices of about 3 millimeters in diameter are perforated successively by high-pressured streams of tiny sand powders, called sand master, so that when the two substrates are subsequently attached together, electrolyte liquid may be injected into the cell through the orifices. Then, the substrates go through ultrasonic facilities that eliminate impurities via ultrasound vibration. The next step is to form a $TiO_2$ layer on the front glass substrate and a silver electrode along the groove cut on the substrate surface. Upon the back substrate, a platinum electrode is formed along the groove on its surface. The next step is to adhere molecular dye sensitizers by covalent bonding to the surface of the $TiO_2$ nano-particles. For that, the front substrate with the $TiO_2$ layer is immersed in a tank containing the dye material and a solvent. Typically, the dye material is sufficiently adhered to the $TiO_2$ nano-particles when the substrate is left immersed in the tank for about four hours. Next, the dyed front glass substrate and the back substrate with the platinum electrode are attached together and sealed by applying heat, pressure, and sealants. Lastly, electrolyte liquid is injected through the orifices on the back substrate into the cell and the orifices are covered by glass.

Up to date, the manufacturing process of DSSCs in the art requires manual handling and implementation of each of the steps described above. Also, the manufacturing process demands manual transportation of cell components between successive steps. Even then, DSSCs can be produced only one by one at a time. Such process is tedious, inefficient, and quite costly and time consuming. Also, in the present manual manufacturing process in the art, it is very difficult to control the parameters in each manufacturing step to maintain or improve the quality of the product. Particularly, one of the biggest hurdles challenging the art in manufacturing DSSCs lies in the dyeing step. The present dyeing technology in the art necessitates immersion of the substrate with the $TiO_2$ layer into a dyeing tank and waiting for about four hours until the dye molecules are sufficiently adhered to $TiO_2$ nano-particles by covalent bonding. That not only prolongs the production time, but also greatly hinders introduction or devise of any smooth, seamless flow of manufacturing line of steps. Another serious problem recognized in manufacturing DSSCs is the sealing of the cells, arising from the use of liquid electrolyte that has a temperature stability problem. Especially when the temperature rises, the liquid expands and tends to leak out of the cell if the sealing is not tight enough. Further, since the electrolyte solution currently used for DSSC contains volatile organic solvents, a great care and need are required for its sealing.

Therefore, there is a strong need in the art for developing a method of mass-producing DSSCs on a large scale in a continuous flow of line of automated steps, which does not require manual handling in each step, so as to reduce cost and production time.

Also, there is a need in the art for developing a method of producing DSSCs in which the parameters of the cells and manufacturing steps can be easily and automatically controlled as desired to ensure even and improved qualities of the products.

Further, there is a need in the art for developing a method in the manufacturing procedures of DSSCs, by which the dyeing of substrate with the $TiO_2$ layer can be done automatically, more rapidly, and in a continuous, seamless line of manufacturing steps without interrupting or prolonging other steps.

Still further, there is a need in the art for developing a method in the manufacturing procedures of DSSCs to ensure a tight sealing of the liquid electrolyte to prevent its undesired leakage.

SUMMARY OF THE INVENTION

In accordance with the present invention, there is provided a system and a method of continuously producing DSSCs via a roll-to-roll process.

In one aspect of the method of the present invention, the method of producing DSSCs via a roll-to-roll process includes: providing a first flexible substrate in transit; forming a titanium dioxide ($TiO_2$) layer upon the first substrate while the first substrate is in transit; sintering the $TiO_2$ layer while the first substrate is in transit; dyeing the $TiO_2$ layer while the first substrate is in transit in a dye tank; loading electrolyte upon the dyed $TiO_2$ layer to form an electrolyte layer while the first substrate is in transit; and attaching a second flexible substrate to the first substrate for sealing the DSSCs while the first substrate is in transit.

In an aspect of the present invention, the first substrate may be provided as a thin film made of a conductive material and the $TiO_2$ layer is formed by spraying $TiO_2$ nano-particles in solvents from a plurality of nozzles through a mask upon the first substrate while the first substrate is in transit, to form a plurality of elongated, spaced apart, and parallel strips as needed for generating a photo-current of a target strength.

In an aspect of the present invention, the $TiO_2$ layer may be sintered by subjecting the $TiO_2$ layer and the first substrate in transit to ultraviolet light or infrared light, a heated wind of air or gas, or to the combination thereof.

In an aspect of the present invention, the $TiO_2$ layer may be dyed in a dye tank by spraying a dye solution onto the $TiO_2$ layer from a plurality of nozzles extending from a plurality of ducts while the first substrate moves inside the dye tank along a conveyor line that is configured to span the interior of the dye tank in multiple passages for prolonging the stay of the substrate in transit within the dye tank and for efficient use of the inner space of the dye tank. In one aspect of the present invention, the conveyor line may be configured as multiple alternating U-shaped lines. The dye tank has a dye solution reservoir for collecting and containing therein the dye solution sprayed from the plurality of nozzles. In one aspect of the invention, the first substrate may be arranged to pass through the dye solution reservoir for immersing the $TiO_2$ layer in the dye solution during the passage. But in another aspect of the invention, the first substrate may not be immersed in the dye solution contained in the dye solution reservoir.

In an aspect of the present invention, the dye solution contained in the dye solution reservoir may be re-circulated in and out of the dye tank. Further, the dyeing conditions such as the temperature or concentration of the dye solution may be controlled in the process of re-circulating the dye solution. The concentration of the dye solution to be sprayed can be controlled via a dye solution dispenser and concentration controller, which receives the re-circulated dye solution from a dye solution circulation pump and feeds it into the plurality of ducts in the dye tank. Similarly, the temperature of the dye solution within the dye tank can be controlled via a temperature controller, which is in fluid communication with the dye solution dispenser and concentration controller. The level of the dye solution contained in the dye solution reservoir can be also adjusted by controlling the amount of the dye solution drawn out of the dye tank through an outlet by the dye circulation pump. This would control the extent to which the $TiO_2$ layer contacts with the dye solution during immersion.

In an aspect of the present invention, electrolyte may be loaded by printing gel-type electrolyte upon the dyed $TiO_2$ layer, while the first substrate is in transit, via a roll-type printing, such as gravure, flexography, offset, and rotary screening printing.

In an aspect of the present invention, the sealing of the DSSCs may be performed by covering another substrate of a thin conductive film, linearly fed from a film roll, upon the first substrate with all component layers finished, and attaching the film to the substrate by applying pressure from two press rolls for sealing, while the film of the first substrate is in transit.

In an aspect of the present invention, the method of producing DSSCs via a roll-to-roll process may further include washing and drying $TiO_2$ layer after the step of dyeing. The washing may be done twice, first time in a washing tank and a second time via pressurized sprayers of washing liquid. The drying may be accomplished by pressurized sprays of heated gas such as air.

In an aspect of the present invention, the method of producing DSSCs via a roll-to-roll process may further include, after dyeing the $TiO_2$ layer, loading a sealing material upon the portions of the first substrate that are without the dyed $TiO_2$ layer while the first substrate is in transit. In one aspect of the invention, a liquid sealant may be sprayed from a plurality of nozzles through a mask upon the portions of the first substrate that are without the dyed $TiO_2$ layer while the first substrate is in transit. In another aspect of the invention, the sealing material may be in the form of a sealing tape dispensed from a roll, and attached to the portions of the first substrate that are without the dyed $TiO_2$ layer while the first substrate is in transit. Loading a sealing material may be performed before or after loading the electrolyte.

The method of producing DSSCs via a roll-to-roll process in the present invention may further include steps for preventing leakage of the electrolyte after the cell is sealed. In one such embodiment, electrolyte leakage can be prevented by erecting an anti-leakage wall, such as a sticky strip of a film with a predetermined thickness, along each side of the dyed $TiO_2$ layer while the first substrate is in transit. For further preventing leakage of the electrolyte arising from uneven thickness of the electrolyte layer, the method may further include the step of leveling the electrolyte layer while the first substrate is in transit after an electrolyte layer is formed upon the dyed $TiO_2$ layer.

In accordance with the present invention, there is also provided a system for dyeing a $TiO_2$ layer on a substrate while the substrate is in transit in the process of producing DSSCs via a roll-to-roll process. The system includes a dye tank, a plurality of ducts arrayed in the dye tank for carrying a dyeing solution, a plurality of nozzles extending from the plurality of ducts for spraying the dyeing solution therefrom, and a conveyor arrayed within the dye tank for continuously transporting a substrate having a $TiO_2$ layer, wherein the conveyor is arranged, for example, up and down along the plurality of ducts to form a web of zigzagged conveyor lines inside the dye tank.

In an aspect of the invention, the system may further include a plurality of pulleys, by which the conveyor is arranged along the plurality of ducts. Furthermore, the dye tank may have a dye solution reservoir therein for collecting and storing the dye solution sprayed from the plurality of nozzles. In an aspect of the invention, the system may further include: an outlet formed at the dye solution reservoir; a dye solution circulation pump in fluid communication with the outlet for circulating the dye solution in the dye solution reservoir into the dye tank; a dye solution dispenser and concentration controller in fluid communication with the dye solution circulation pump and with the plurality of ducts for controlling the amount and the concentration of the dye solution to be circulated into the plurality of ducts in the dye tank; and a temperature controller in fluid communication with the dye solution dispenser and concentration controller for controlling the temperature of the dye solution to be circulated into the plurality of ducts in the dye tank.

The system and method in the present invention for continuously producing DSSCs through a roll-to-roll process solves may problems recognized in the prior art in production of DSSCs, and provides many advantages over the prior art. One of the advantages is a significant reduction in total manufacturing time and cost owing to the capability of a mass production utilizing an integrated line of a seamless, non-stop manufacturing process automated from beginning to an end. Another advantage is a significant save in, and efficient use of, manufacturing space, arising from the roll-to-roll production line in the present invention, in which each step forming individual layers or components of DSSCs is efficiently arranged.

Another advantage provided by the present invention is the capability of improving quality control and maintenance of the products, and enhanced reproducibility. This is obtained from the capability of the present invention of easily varying and controlling the parameters of the cell and manufacturing steps in a computer-controlled automated manufacturing process.

Still another advantage of the present invention is the capability of efficiently shortening the lengthy thermal and chemical processes in the formation and manipulation of individual layers of DSSCs.

Still another advantage of the present invention is that the technical difficulties formerly present in the essential step of dyeing the substrate with the $TiO_2$ layer, the greatest huddle in automating the production process and reducing the production time and cost, have been overcome through a roll-to-roll dyeing method in the present invention.

Still another advantage of the present invention is the provision of a solution to the problem of liquid electrolyte leakage that harassed the art of DSSCs production for a long time.

BRIEF DESCRIPTION OF THE DRAWINGS

FIG. 5A is a schematic view of loading a sealing material upon the portions of a substrate that are without strips of a dyed $TiO_2$/electrolyte layer, utilizing a spray printing method;

FIG. 8 is a schematic view of attaching a conductive and protective film to a substrate having a dyed $TiO_2$/electrolyte layer, and sealing DSSCs; and FIG. 9 is a schematic view of a roll-to-roll process for manufacturing DSSCs in accordance with the present invention.

DETAILED DESCRIPTION OF THE INVENTION

The drawings to be described herein are shown for purposes of illustrating only certain embodiments of the present invention, and not for any purpose of limiting the invention. In the present invention, which employs a roll-to-roll process for manufacturing Dye-Sensitized Solar Cells (DSSCs), the entire manufacturing steps for installing successive component layers of a DSSC are performed and accomplished while a substrate and the installed layers are in transit, that is, move continuously and uninterruptedly, loaded on a roller conveyor or other known conveying means used in a roll-to-roll process in the art.

Now referring to FIGS. 1-11, FIG. 1 schematically illustrates printing a titanium-dioxide ($TiO_2$) layer 10 on a substrate 20. Before the printing of the $TiO_2$ layer 10, the substrate 20 is provided and made in transit on a roller conveyor. The term "providing" or "provided" is meant in a broad sense to encompass any form of "acquiring" from any source, including, but not limited to, manufacturing, buying, obtaining, or selecting from available supplies. In one embodiment of the present invention, the substrate 20 is a thin, flexible film made of one or more conductive and protective materials to function as the transparent electrode in a conventional DSSC that collects electrons diffused from the $TiO_2$ layer and transports to an external circuit. The film also provides a protection over the $TiO_2$ layer 10 against external damage. The materials used for the substrate 20 are well known in the art. For example, the substrate may be made from coating indium tin oxide, a well known material for a transparent electrode in a conventional DSSC, on a film of PET (polyethylene terephthalate) or PEN (polyethylene naphtalate).

Figure 1:
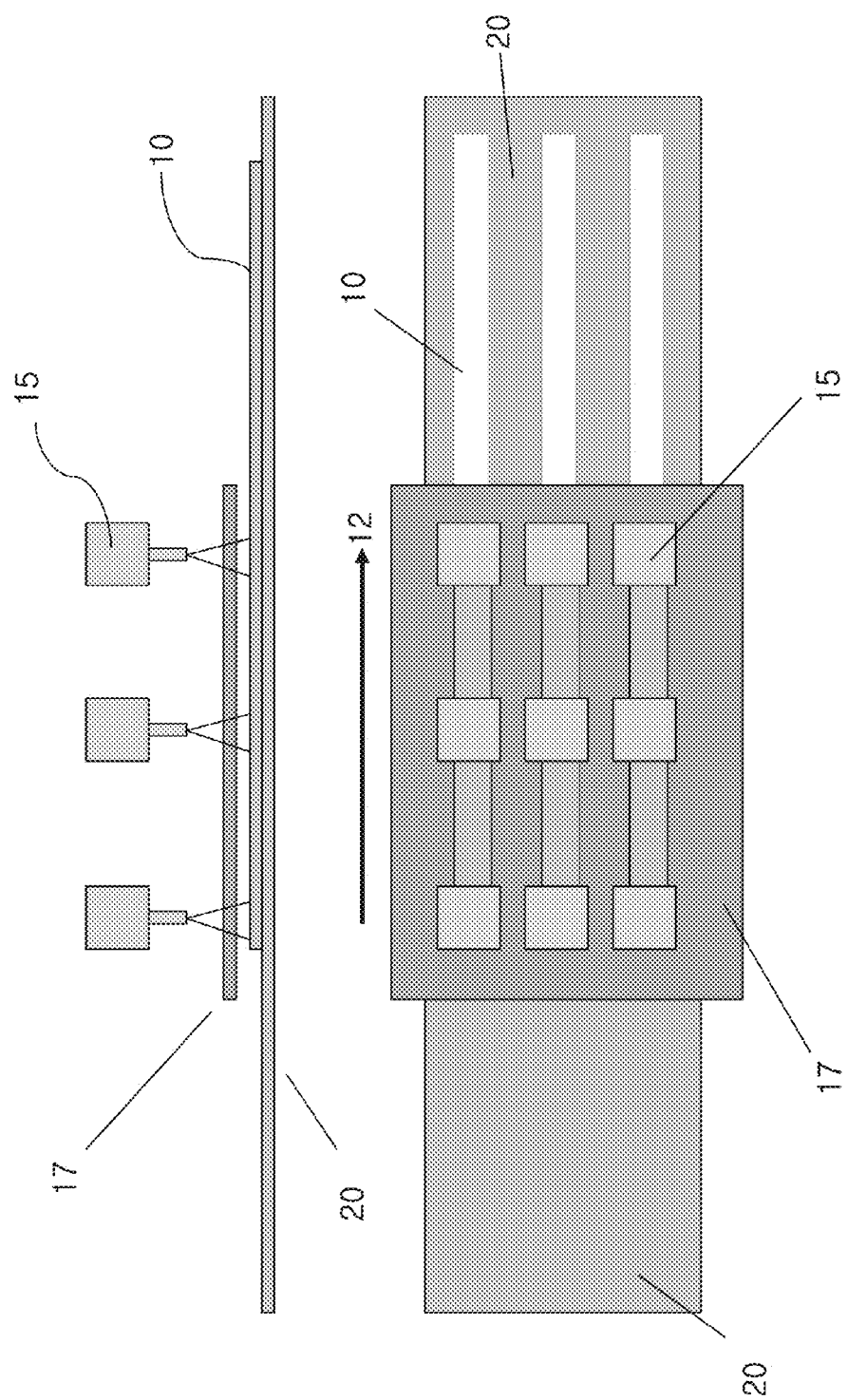
FIG. 1 is a schematic view of printing a $TiO_2$ layer on a substrate via a spray printing method while the substrate is in transit on a conveyor.

In one embodiment of the present invention, the $TiO_2$ layer 10 may be printed by a spray-printing method while the substrate 20 is constantly in transit in the arrowed direction 12, in which $TiO_2$ nano-particles in liquid state, preferably in a solvent, are successively sprayed from multiple nozzles 15 that are spaced apart and positioned directly above the substrate 20, preferably, through a mask 17 to form spaced-apart parallel strips of a $TiO_2$ layer 10 of a predetermined thickness on the substrate 20. The number of strips of the $TiO_2$ layer 10 can be varied depending upon the net photo-current desired. For example, to produce a DSSC having a single $TiO_2$ layer that generates ~0.7 volt, 3 parallel strips of $TiO_2$ layers may need to be formed upon the substrate, as shown in FIG. 1, to generate about 2 volt of photo current. The amount and density of $TiO_2$ nano-particles sprayed on the substrate, the number of $TiO_2$ strips, and the thickness and width of each $TiO_2$ strip may be varied and controlled by a computer and a controller (not shown) connected to the nozzles 15. The adequate values of parameters for forming a $TiO_2$ layer, such as the amount and density of $TiO_2$ nano-particles or the thickness and width of a $TiO_2$ layer, are known in the art.

Figure 2:
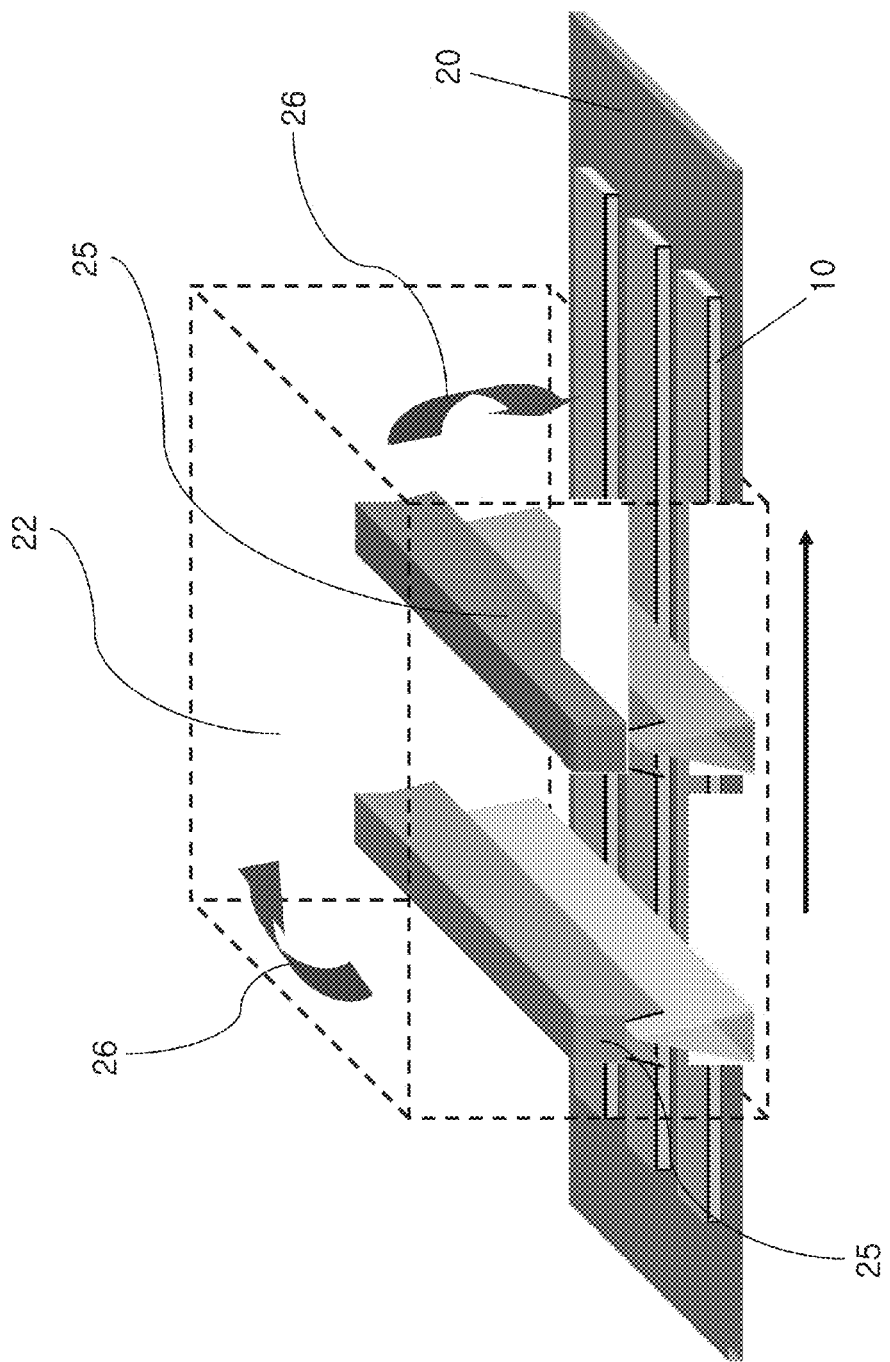
FIG. 2 is a schematic view of sintering a $TiO_2$ layer.

FIG. 2 schematically illustrates sintering the $TiO_2$ layer on the substrate. When the $TiO_2$ layer is printed on a substrate, it is in a state of slurry paste with solvents and binders mixed together. Most of the solvents and binders in a $TiO_2$ layer are evaporated after printing thereof, but a few remnants contained therein, which act as impurities, may form porosities in the layer to deteriorate the density of the $TiO_2$ nano-particles and electric conductivity, or cause break in current production. The sintering step eliminates such undesired impurities remaining in a $TiO_2$ layer and helps the $TiO_2$ nano-particles stick together. After the $TiO_2$ layer 10 is printed on the substrate, the substrate film 20 is transported on a conveyor into a sintering chamber 22, in which the $TiO_2$ layer 10 is subjected to ultraviolet (UV) or infrared (IR) radiation via UV or IR lamps 25, or a circulating heat wind of gas or air 26. Or, it can be sintered by combined application of these treatments. The dosage, intensity, or duration of such individual or combined sintering treatments are well known in the art, and therefore, not described herein further.

Figure 3A:
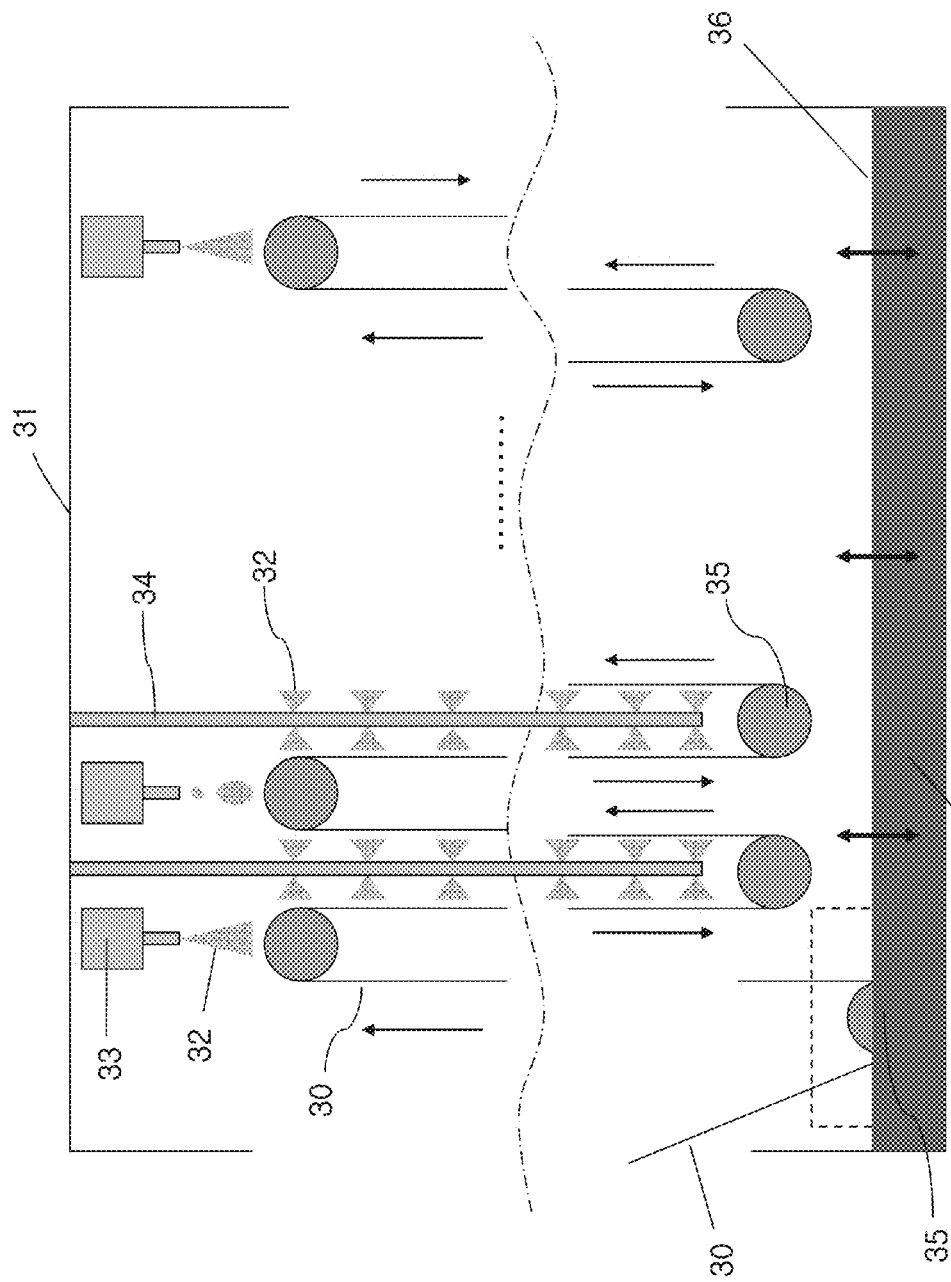
FIG. 3A is a schematic view of dyeing a $TiO_2$ layer on a substrate in a dye tank.

FIG. 3A schematically describes dyeing the $TiO_2$ layer on the substrate in a dye tank after the sintering step. In the present invention, the dyeing is accomplished while the substrate with the $TiO_2$ layer substantially constantly moves on a conveyor without interruption or ceasing a smooth flow of manufacturing line of steps. This is distinguished from the conventional method in the art that mandates immersion of the substrate with $TiO_2$ layer into a dye solution and waiting time of several hours. Such requirement has been the major technical hurdle that has barred the incorporation of the entire manufacturing steps of DSSCs into a single integrated line of continuous and uninterrupted roll-to-roll process.

The present invention breaks through such a hurdle in the dyeing step. After being sintered, the substrate with the $TiO_2$ layer is transported into a dyeing tank 31 via a roller conveyor 30 and there dyed while substantially constantly in transit on the conveyor 30 as schematically illustrated in FIG. 3A. In one embodiment of the present invention, a dyeing material in one or more solvents 32, hereinafter called the dye solution 32, is sprayed onto the substrate having the sintered $TiO_2$ layer thereon from a plurality of nozzles 33 in the dye tank 31. The nozzles 33 extend from a plurality of ducts 34 arrayed in the dye tank 31, which are, again, arrayed around the conveyor lines 30. In the present invention, the conveyor line 30 carrying the substrate in transit are arrayed and configured to span the interior of the dye tank 31 in multiple passages or trips in order to efficiently use the space within the tank 31 as well as to sufficiently prolong the substrate's journey and stay within the dye tank for ensuring sufficient time for dyeing the $TiO_2$ layer.

In one embodiment of the present invention, the ducts 34 transporting the dye solution are arrayed substantially parallel to one another, and the conveyor line 30 within the dye tank 31 carrying the substrate in transit are arrayed up and down along the ducts 34 to form a configuration of alternating multiple U-shaped lines, aided by a plurality of rollers or pulleys 35 for changing directions, as schematically shown in FIG. 3A. What is contemplated by the present invention for ways of arraying the conveyor lines inside the dye tank is, however, not limited to the particular array described above and illustrated in FIG. 3A. In another embodiment (not shown), the conveyor lines inside the dye tank may take other geometrical configurations, such as multiple alternating sinusoidal, undulating, serpentine, or zigzagged lines, or any other configuration of lines that is designed to prolong the stay of the moving substrate inside the dye tank, while making the most of the interior space of the dye tank, until the $TiO_2$ layer is sufficiently spray-dyed.

Depending upon the particular configuration of the conveyor lines, the dye solution ducts and the spraying nozzles extending from the ducts may be accordingly arrayed and oriented to ensure that at a particular nozzle, the dye solution sprayed from that nozzles applies to the $TiO_2$ layer substantially perpendicularly.

The dyeing of the $TiO_2$ layer need not be accomplished only from spraying of the dye solution from the nozzles. The conveyor lines may be further arranged to have the substrate having the $TiO_2$ layer, during its journey between the web of nozzles along a specifically configured conveyor lines, immersed for a desired time under the dye solution stored inside the dye tank for enhancing the efficiency of absorption or adhesion of the dye molecules to the $TiO_2$ nano-particles and shorten the total dyeing time. In one embodiment of the invention, as shown in FIG. 3A, the dye tank 31 may have a dye solution reservoir 36 at its bottom, which collects and stores, for reuse, the dye solution 32 that is sprayed from the nozzles 33. And the multiple U-shaped alternating conveyor lines may be further arranged to pass, one or multiple times, through the dye solution 32 in the dye solution reservoir 36. In such a configuration, the $TiO_2$ layer would be immersed in the dye solution 32 during the passage of the substrate through the dye solution reservoir 36. Also, by adjusting the level of dye solution 32 contained in the dye solution reservoir 36, the duration of the immersion of the $TiO_2$ layer in the dye solution 32, or the extent to which the $TiO_2$ layer contacts with the dye solution 32 contained in the dye solution reservoir 36 can be controlled.

Figure 3B:
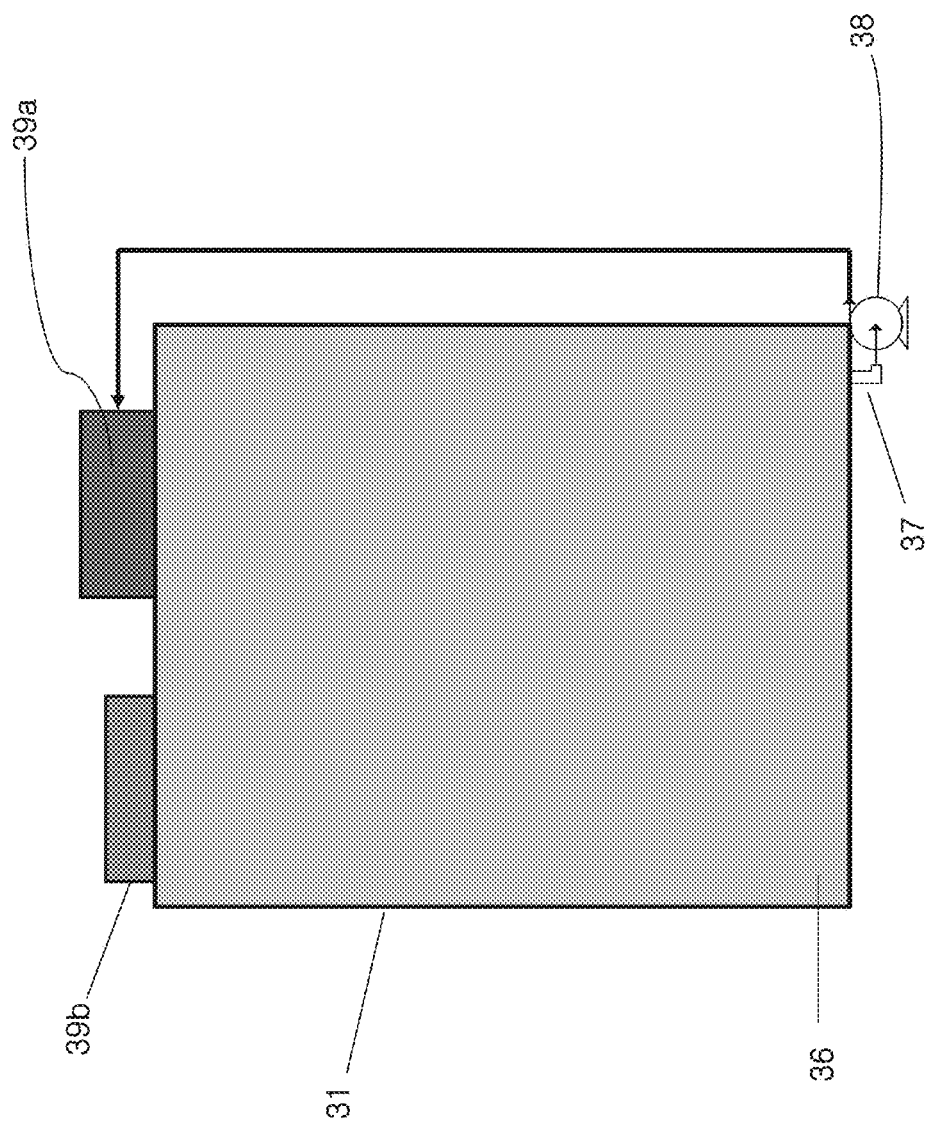
FIG. 3B is a schematic view of a dyeing tank connected to a temperature controller, a dye solution dispenser and concentration controller, and a dye solution circulation pump.

In the present invention, other dyeing conditions may be controlled. In one embodiment of the present invention, the dye solution stored in the dye tank may be re-circulated in and out of the dye tank and the dyeing conditions may be controlled by adjusting the temperature, concentration, or in-tank level of the dye solution of the re-circulated the dye solution. As illustrated in FIG. 3B, the dye tank 31 may include an outlet 37 formed at the dye solution reservoir 36 for removing the dye solution, the outlet 37 being in fluid communication with a dye solution circulation pump 38. The dye solution drawn by the circulation pump 38 is fed into a dye solution dispenser and concentration controller 39a for re-circulation, which is connected to a temperature controller 39b as well as to the plurality of ducts and spray nozzles in the dye tank.

Before the dye solution is re-circulated into the dye tank through the ducts and nozzles, the dye solution dispenser and concentration controller 39a readjusts, if necessary, the concentration of the dye solution. Similarly, the amount of the dye solution re-circulated into the dye tank can be controlled by controlling either the amount of the dye solution drained from dye solution reservoir 36 via the circulation pump 38, or the amount of the dye solution dispensed into the dye tank via the dye solution dispenser and concentration controller 39a. Also, the temperature of the dye solution in the dye tank 31 can be readjusted, again if necessary, via the temperature controller 39b. In this manner, the reuse of the dye solution and dyeing conditions can be controlled in the present invention. The temperature and concentration of the dye solution, and the level of the dye solution contained in the dye solution reservoir 36 may be measured by respective sensors (not shown) connected to the controllers 39a and 39b, and the pump 38, as well as to computers (not shown). Since the structures, constructions, or functions of typical sensors/controllers of the temperature, concentration, or fluid level for a liquid are known in the art, the details are not further described herein.

The materials used for dye are known in the art, which are still under research and development. The one most commonly used, and known in the art as possessing best efficiency up to date, is an organic or metallic compound of ruthenium (Ru complexes), such as N3, N719, or N749, commonly referred to as a black dye. But other quantum inorganic compounds such as InP or CdSe, or organic or high molecule compounds dye materials known in the art may be used. The solvent(s) for the dye material to make dye solution is also well known in the art.

Figure 4:
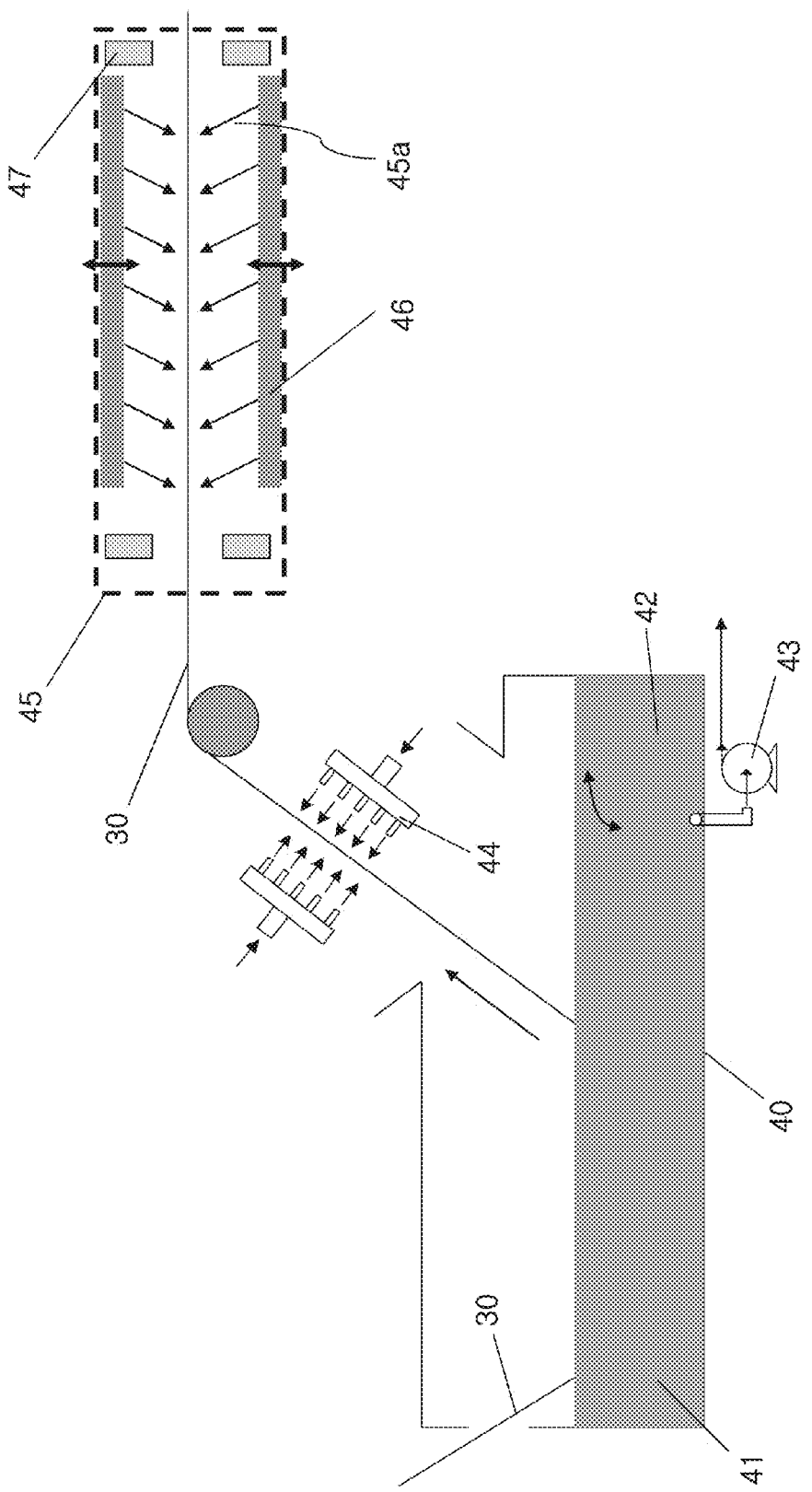
FIG. 4 is a schematic view of washing and drying a dyed $TiO_2$ layer and substrate.

FIG. 4 schematically illustrates washing and drying the dyed $TiO_2$ layer and substrate after the dyeing step. The washing removes any dyeing solution from regions without the $TiO_2$ layer on the substrate. The dyed substrate-$TiO_2$ layer, after coming out of the dye tank, is transported on the conveyor 30 into a washing tank 40 containing washing liquid 41 for the first washing. The washing liquid 41 may be water or any other suitable organic, inorganic solvents known in the art. In one embodiment of the present invention, the washing liquid 41 in the washing tank 40 is agitated via a vortex generator 42 for more efficient washing. The level of washing liquid 41 may be adjusted via a leveling pump 43. Coming out of the washing tank 40, the dyed substrate-$TiO_2$ layer is washed again, in one embodiment, while passing between pressurized sprayers 44 of washing liquid.

Next, the substrate having the dyed $TiO_2$ layer is transported by the conveyor 30 into a drier 45 of hot gas such as air, where heated gas 45a is applied from nozzles thereto for drying off the washing liquid. In one embodiment of the present invention, the position and angle of the nozzles that inject heated gas may be adjusted via a controller 46 for angled application of hot gas to the substrate having the dyed $TiO_2$ layer, as shown in FIG. 4, to effect more efficient drying. The duration and intensity of the hot gas injection may be controlled via a hot gas exhaust controller 47.

FIG. 5A schematically illustrates loading a sealing material upon the portions of the substrate 20 that are without the strips of a dyed $TiO_2$ layer 10. Via the sealing material, another substrate or film acting as a counter electrode may be subsequently attached to the substrate 20 for sealing the cell at the final manufacturing stage of a DSSC. The sealing material may be any suitable material known in the art to function as a bonding agent such as glue, including, but not limited to, epoxy glue, water glass (sodium silicate), or surlyn. In one embodiment of the present invention, the sealing material is attached via a spray-printing method similar to the printing of the $TiO_2$ layer illustrated in FIG. 1. In this embodiment, a liquid sealant 51 is sprayed from a plurality of nozzles 52 through a mask 53 on the portions of the substrate 20 alternately located between the strips of a dyed $TiO_2$ layer 10.

Figure 5B:
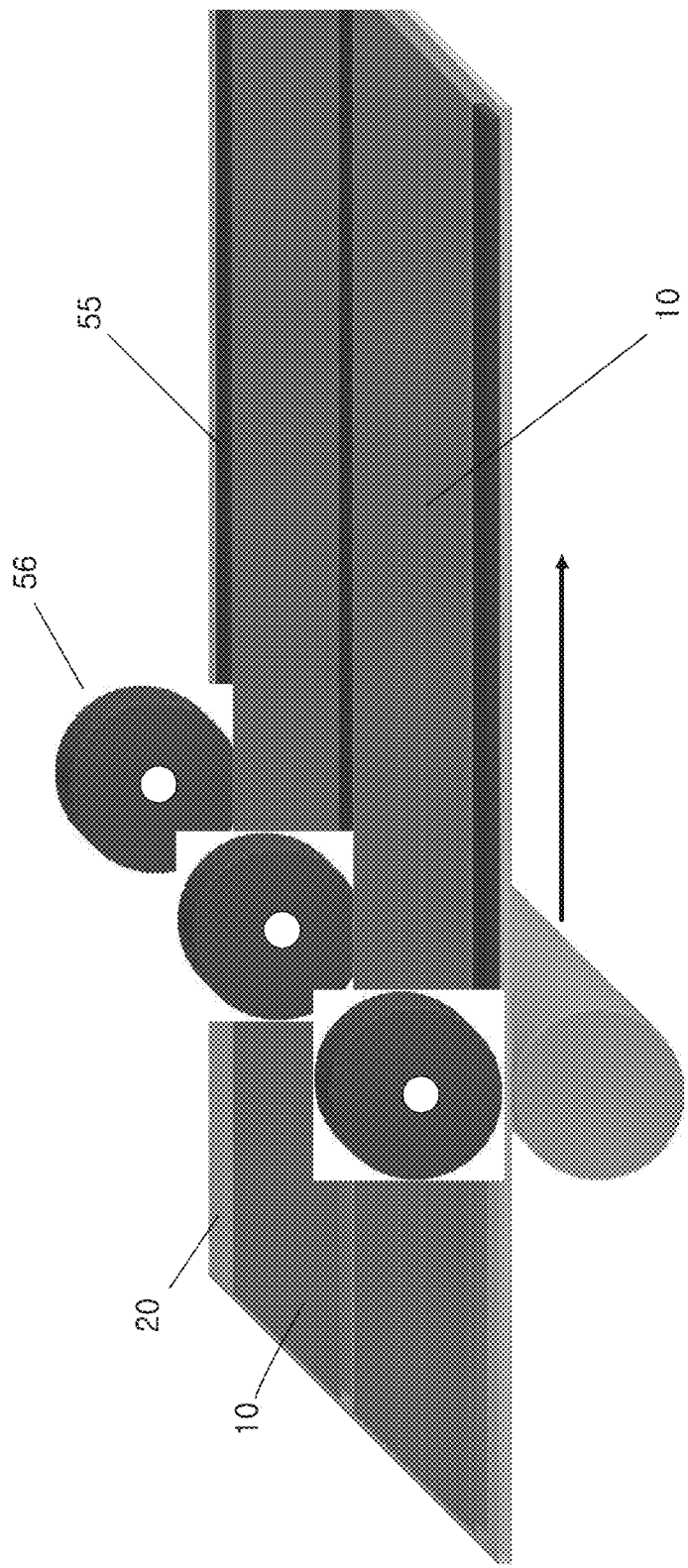
FIG. 5B is a schematic view of loading a sealing material upon the portions of a substrate that are without strips of a dyed $TiO_2$/electrolyte layer, utilizing a sealing tape.

FIG. 5B schematically illustrates another embodiment of loading a sealing material upon the portions of the substrate 20 without the strips of the dyed $TiO_2$ layer 10. In this particular embodiment, the sealing material is made into the form of a thin film 55, a sealing tape, which is dispensed from a roll 56 to attach to the portions of the substrate without the strips of a dyed $TiO_2$ layer 10.

Figure 6:
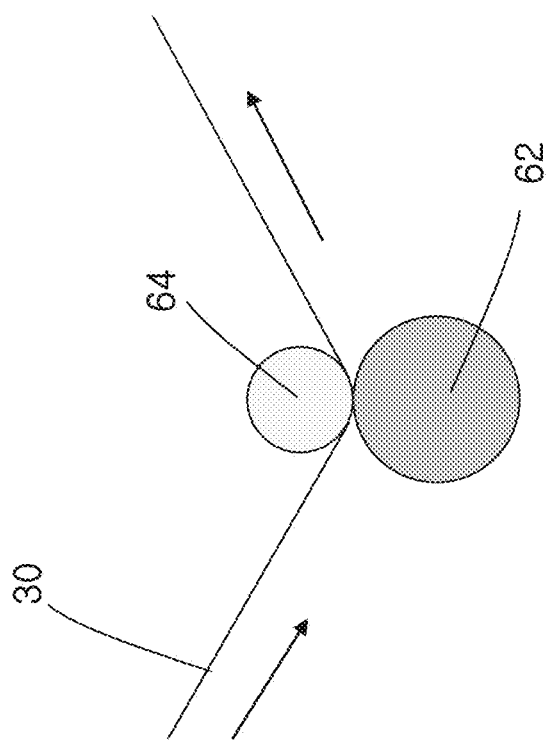
FIG. 6 is a schematic view of printing an electrolyte upon dyed strips of a $TiO_2$ layer.

FIG. 6 schematically illustrates loading electrolyte upon the dyed strips of $TiO_2$ layer in a roll-to-roll process. In conventionally manufacturing of a DSSC, an electrolyte liquid is injected into the cell at the final stage through holes between the front and second substrates (typically glass) after the two substrates are attached together. Such a process has been known to entail chronic problems of sealing and leakage of electrolyte out of the cell. In the preferred embodiment of the present invention, however, a roll-type printing method is employed to print a gel-type electrolyte upon the dyed $TiO_2$ layer. Although a standard roll-type printing method has been known in the art, it was not heretofore employed in loading electrolyte during DSSCs fabrication. In the conventional method of manufacturing of DSSCs, typically liquid electrolytes such as acetonitrile have been used. In the roll-to-roll process in the present invention that employs a roll-type printing method for electrolyte loading, high molecule solid electrolytes in gel form such as PVdF (poly vinylidene fluoride co-hexafluoropropylene) or PAN (polyacrylonitrile) are preferably used for the high viscosity.

As shown in FIG. 6, while the substrate with the dyed $TiO_2$ layer, loaded on the conveyor 30, passes between two rolls, 62 and 64, the gel-type electrolyte coated upon a plurality of intaglios or reliefs (not shown) engraved on the surface of the pattern roll 62 is printed upon the strips of dyed $TiO_2$ layer on the substrate. While the printing is done, the impression roll 64 acts to press the substrate with the dyed $TiO_2$ layer toward the pattern roll 62. The roll-type printing method employed in the present invention includes, but is not limited to, gravure, flexography, offset, and rotary screening printing. The details of such standard roll-type printing methods are known in the art, and therefore, not described herein further.

In FIGS. 5A and 5B illustrating the two embodiments of loading a sealing material, the loading has been illustrated as being performed before printing the electrolyte upon the dyed strips of $TiO_2$ layer. What is contemplated in the present invention is, however, not so limited. Either embodiment of the loading of a sealing material illustrated in FIGS. 5A and 5B may as well be performed, as can be seen in FIG. 9, after the electrolyte is loaded or printed. In that case, the sealing material would be attached or printed upon the portions of the substrate that are without the strips of a dyed $TiO_2$/electrolyte layers.

Figure 7:
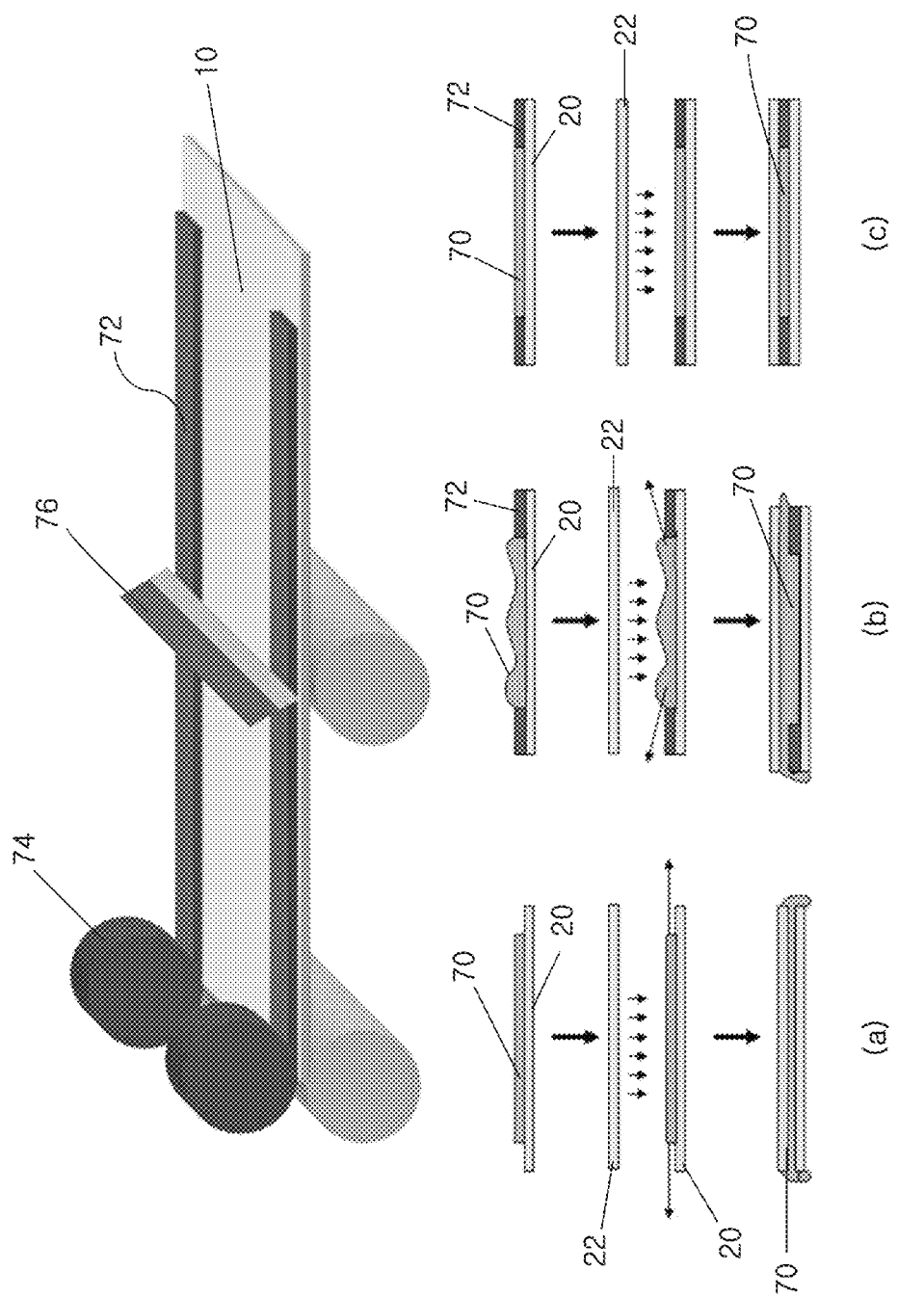
FIG. 7 is a schematic view of erecting anti-leakage walls and leveling an electrolyte layer for preventing potential leakage of the electrolyte.

FIG. 7 schematically illustrates methods contemplated by the present invention for preventing potential leakage of the electrolytes. In one embodiment of the present invention, preferably before the electrolyte is printed or otherwise loaded upon the strips of the dyed $TiO_2$ layer on the substrate, an anti-leakage wall 72 is erected along each side of each strip of the dyed $TiO_2$ layer 10 so as to prevent subsequent potential leakage of the electrolyte after sealing. As shown in FIG. 7(a), without the anti-leakage walls present, the gel-type electrolyte 70, after being loaded or printed upon the dyed $TiO_2$ layer, would tend to leak out of the cell in the lateral (arrowed) direction when pressed down by another substrate 22 to be attached to the substrate 20 at the final sealing stage in manufacturing a DSSC. The anti-leakage walls 72 in one embodiment of the present invention may be a sticky film of a desired thickness, which may be dispensed from a roll 74 and stick to each side of the electrolyte layer 70 as shown in FIG. 7. In another embodiment, however, the anti-leakage walls may be made of any other suitable material that would serve the same purpose of limiting the leakage of electrolyte from a finished DSSC assembly.

Further, even if the anti-leakage walls 72 were in place, if the thickness of the gel-type electrolyte layer 70 is not uniform, the electrolyte would again tend to leak out over the walls 72 as shown in FIG. 7(b). To prevent that, a blade 76 may be further employed in one embodiment of the present invention to level the electrolyte layer 70 and obtain even thickness after the electrolyte is printed or otherwise loaded upon the strips of the dyed $TiO_2$ layer. Then as shown in FIG. 7(c), the leakage of the electrolyte would be effectively prevented.

FIG. 8 schematically illustrates attaching, via the preloaded sealing material described in FIGS. 5A and 5B, another flexible substrate of a conductive material 80 to the substrate 20 having the dyed $TiO_2$/electrolyte layers thereon, and sealing the entire cell. The film 80 acts as a counter electrode of metal in a conventional DSSC, which receives electrons from an external circuit and provides them into the cell for repeated oxidation and reduction processes between the electrolyte and dye molecules. The substrate 80 also acts as a cover to protect the interior of the cell. In one embodiment of the present invention, the substrate 80 is a pre-manufactured thin, flexible film made of conductive and protective materials, the same kind used for the substrate 20 in FIG. 1. As shown in FIG. 8, the film 80 may be continuously fed from a film roll 82, and join the substrate 20 having the dyed $TiO_2$/electrolyte layers and preloaded sealing materials thereon, at two press rolls, 84 and 86. There, the film 80 covers the substrate 20 having the dyed $TiO_2$/electrolyte layers thereon, and adheres to the substrate 20 by the pressures from the two rolls 84 and 86 to seal the cell, thereby producing the finished DSSCs. The press rolls 84 and 86 may have a plurality of alternating regions of embosses 85 and depressions 87 on their respective surfaces for protecting the electrolyte layer during the sealing process, whereby the strips of dyed $TiO_2$/electrolyte layers are positioned to match the regions of depressions 87 of the two press rolls to avoid direct downward pressure therefrom. In the preferred embodiment, the process of attaching the film 80 and sealing the cell by adhesion via two press rolls may be performed in a hot air drier 88 for greater efficiency, as shown in FIG. 8.

FIG. 9 schematically illustrates, in an aspect, the steps of the roll-to-roll process 90 for continuously producing DSSCs, contemplated by the present invention. The process includes: the step 91 of printing plurality of strips of a $TiO_2$ layer on a substrate, the step 92 of sintering the $TiO_2$ layer, the step 93 of dyeing the $TiO_2$ layer, the step 94 of washing and drying the dyed $TiO_2$ layer and substrate, the step 95 of printing electrolyte upon the $TiO_2$ layer, the step 96 of loading sealing material to the portions on the substrate without the $TiO_2$ layer, and the step 97 of attaching a pre-manufactured film of protective and conductive materials to the substrate having the $TiO_2$/electrolyte layers via the preloaded sealing material. After the sealing, the film of DSSCs may be wound into a roll 98. FIG. 9 shows the continuous, non-stop conveyor line 100 with a plurality of rollers or pulleys 99, upon which the substrate having component layers of DSSCs being built in each step is placed and moves along, i.e., is in transit.

While particular forms of the inventions have been illustrated and described, it will be apparent to those skilled in the art that various modifications can be made without departing from the inventive concept. References to use of the invention with a specific materials, parts, or procedures in describing and illustrating the invention herein are by way of example only, and the described embodiments are to be considered in all respects only as illustrative and not restrictive. The present invention may be embodied in other specific forms without departing from its spirit or essential characteristics. Accordingly, it is not intended that the invention be limited except by the appended claims.

We claim:

1. A method of continuously producing Dye-Sensitized Solar Cells (DSSCs) via a roll-to-roll process, comprising the steps of:

providing a first flexible substrate in transit;

forming a titanium dioxide ($TiO_2$) layer upon the first flexible substrate while the first flexible substrate is in transit;

sintering the $TiO_2$ layer while the first substrate is in transit;

dyeing the $TiO_2$ layer while the first flexible substrate is in transit in a dye tank;

loading electrolyte upon the dyed $TiO_2$ layer to form an electrolyte layer while the first flexible substrate is in transit; and attaching a second flexible substrate to the first flexible substrate while the first flexible substrate is in transit, wherein dyeing the $TiO_2$ layer comprises spraying a dye solution, upon the $TiO_2$ layer, from a first plurality of nozzles arrayed in the dye tank around the first flexible substrate in transit while the first flexible substrate is in transit.

2. The method of claim 1, wherein the first flexible substrate is a thin film fabricated of a conductive material.

3. The method of claim 2, wherein forming the $TiO_2$ layer comprises spraying $TiO_2$ nano-particles in one or more solvents from a second plurality of nozzles through a mask upon the first flexible substrate while the first flexible substrate is in transit.

4. The method of claim 3, wherein forming the $TiO_2$ layer comprises forming a plurality of elongated, spaced-apart, and parallel strips of the $TiO_2$ layer.

5. The method of claim 1, wherein sintering the $TiO_2$ layer comprises subjecting the $TiO_2$ layer and the first flexible substrate to at least one sintering source selected from the group consisting of ultraviolet light, infrared light, and a heated wind of gas while the first flexible substrate is in transit.

6. The method of claim 1, wherein the first flexible substrate in transit is arranged to move inside the dye tank along a conveyor line that is configured to span the interior of the dye tank in multiple passages for prolonging the stay of the first flexible substrate in transit within the dye tank and for more efficient use of the inner space of the dye tank.

7. The method of claim 6, wherein the conveyor line inside the dye tank has a configuration of alternating multiple U-shaped lines.

8. The method of claim 6, wherein the dye tank has a dye solution reservoir therein for collecting and containing the dye solution sprayed from the first plurality of nozzles.

9. The method of claim 8, wherein the conveyor line in the dye tank is configured not to pass through the dye solution reservoir.

10. The method of claim 8, wherein the conveyor line in the dye tank is configured to pass through the dye solution reservoir for immersion of the $TiO_2$ layer in the dye solution contained therein.

11. The method of claim 8, wherein dyeing the $TiO_2$ layer further comprises re-circulating the dye solution contained in the dye solution reservoir, out of and into the dye tank.

12. The method of claim 11, wherein dyeing the $TiO_2$ layer further comprises controlling a level of the dye solution contained in the dye solution reservoir.

13. The method of claim 11, wherein dyeing the $TiO_2$ layer further comprises controlling a concentration of the re-circulated dye solution.

14. The method of claim 11, wherein dyeing the $TiO_2$ layer further comprises controlling a temperature of the re-circulated dye solution.

15. The method of claim 1, wherein loading electrolyte comprises printing gel-type electrolyte upon the dyed $TiO_2$ layer via a roll-type printing while the first flexible substrate is in transit.

16. The method of claim 15, wherein the roll-type printing is selected from the group consisting of gravure, flexography, offset, and rotary screening printing.

17. The method of claim 1, wherein the second flexible substrate is a thin film fabricated of a conductive material.

18. The method of claim 17, wherein attaching the second flexible substrate comprises the steps of:
feeding a thin conductive film from a film roll, and
attaching the thin conductive film to the first flexible substrate between two press rolls while the first flexible substrate and the thin conductive film are in transit.

19. The method of claim 1, further comprising, after dyeing the $TiO_2$ layer, the steps of:
washing the dyed $TiO_2$ layer and the first flexible substrate while the first flexible substrate is in transit, and
drying the dyed $TiO_2$ layer and the first flexible substrate while the first flexible substrate is in transit.

20. The method of claim 19, wherein washing the dyed $TiO_2$ layer and the first flexible substrate comprises washing once in a washing tank and washing twice via pressurized sprayers of a washing liquid.

21. The method of claim 19, wherein drying comprises drying the dyed $TiO_2$ layer and the first flexible substrate via pressurized sprays of heated air.

22. The method of claim 1, further comprising, after dyeing the $TiO_2$ layer, loading a sealing material upon the portions of the first flexible substrate that are without the dyed $TiO_2$ layer while the first flexible substrate is in transit.

23. The method of claim 22, wherein loading a sealing material comprises spraying a liquid sealant from a third plurality of nozzles through a mask upon the portions of the first flexible substrate that are without the dyed $TiO_2$ layer while the first substrate is in transit.

24. The method of claim 22, wherein loading a sealing material comprises attaching a sealing tape dispensed from a roll to the portions of the first flexible substrate that are without the dyed $TiO_2$ layer.

25. The method of claim 22, wherein loading a sealing material is performed before loading electrolyte.

26. The method of claim 22, wherein loading a sealing material is performed after loading electrolyte.

27. The method of claim 1, further comprising erecting an anti-leakage wall along each side of the dyed $TiO_2$ layer while the first flexible substrate is in transit for preventing leakage of the electrolyte.

28. The method of claim 27, further comprising leveling the electrolyte layer while the first flexible substrate is in transit for further preventing leakage of the electrolyte.

* * * * *